March 28, 1950 J. G. REID, JR 2,502,104
ABSORPTION REFRIGERATION CONTROL
Filed April 5, 1945 3 Sheets-Sheet 1

INVENTOR
John G. Reid Jr.
BY
Oliver S. Titcomb
ATTORNEY

Patented Mar. 28, 1950

2,502,104

UNITED STATES PATENT OFFICE 2,502,104

ABSORPTION REFRIGERATION CONTROL

John G. Reid, Jr., Evansville, Ind., assignor to Servel, Inc., New York, N. Y., a corporation of Delaware Application April 5, 1945, Serial No. 586,731

26 Claims. (Cl. 62—5)

The present invention relates to refrigeration and more particularly to an improved automatic control for controlling the operation of a refrigeration system.

While the control of the present invention may be used with other systems, it is particularly adapted for use with an absorption refrigeration system of the type which operates in a partial vacuum and utilizes water as a refrigerant and a salt solution as an absorbent. The refrigerant and absorbent are introduced into the system as a water solution of a salt such as lithium chloride, lithium bromide, or the like, and the absorbent occurs in the system as a dilute or a concentrated water solution of the salt. Such refrigeration systems are used for air conditioning by circulating air to be cooled over the surface of an evaporator or cooling unit containing refrigerant.

One of the objects of the present invention is to provide a control for initiating the operation of the refrigeration system in response to the temperature of the ambient to be cooled and varying the rate of operation of the system in response to a condition of the refrigerant in the evaporator.

Another object is to control the rate of operation of the refrigeration system in response to variations in the temperature of the refrigerant in the evaporator to maintain the lowest evaporator temperature consistent with the load to insure a maximum latent-to-sensible heat removal from the air to be cooled.

Another object is to control the rate of operation to maintain a low evaporator temperature while at the same time prevent the refrigerant from freezing in the evaporator.

Another object is to vary the amount of heat supplied to an absorption refrigeration system in accordance with variations in the evaporator temperature.

Another object is to vary the amount of heat supplied to an absorption refrigeration system in accordance with variations in the temperature of the refrigerant in the evaporator until the maximum capacity of the system is reached and then modify the control to supply heat at a constant rate for maximum capacity.

Another object is to provide an air conditioner with a control for simultaneously initiating operation of a refrigeration apparatus and air circulating means in response to a change in the temperature of the ambient and controlling the rate of operation of the refrigeration apparatus in response to the temperature of the refrigerant in the evaporator.

Still another object is to simplify the control for an absorption refrigeration system, render the control more flexible and improve the operating characteristics of the system under heavy loads.

These and other objects will become more apparent from the following description and drawings, in which like characters denote like parts throughout the several views. It is to be expressly understood, however, that the drawings are for the purpose of illustration only and not a definition of the limits of the invention, reference being had for this purpose to the appended claims. In the drawings:

Figures 1, 2:
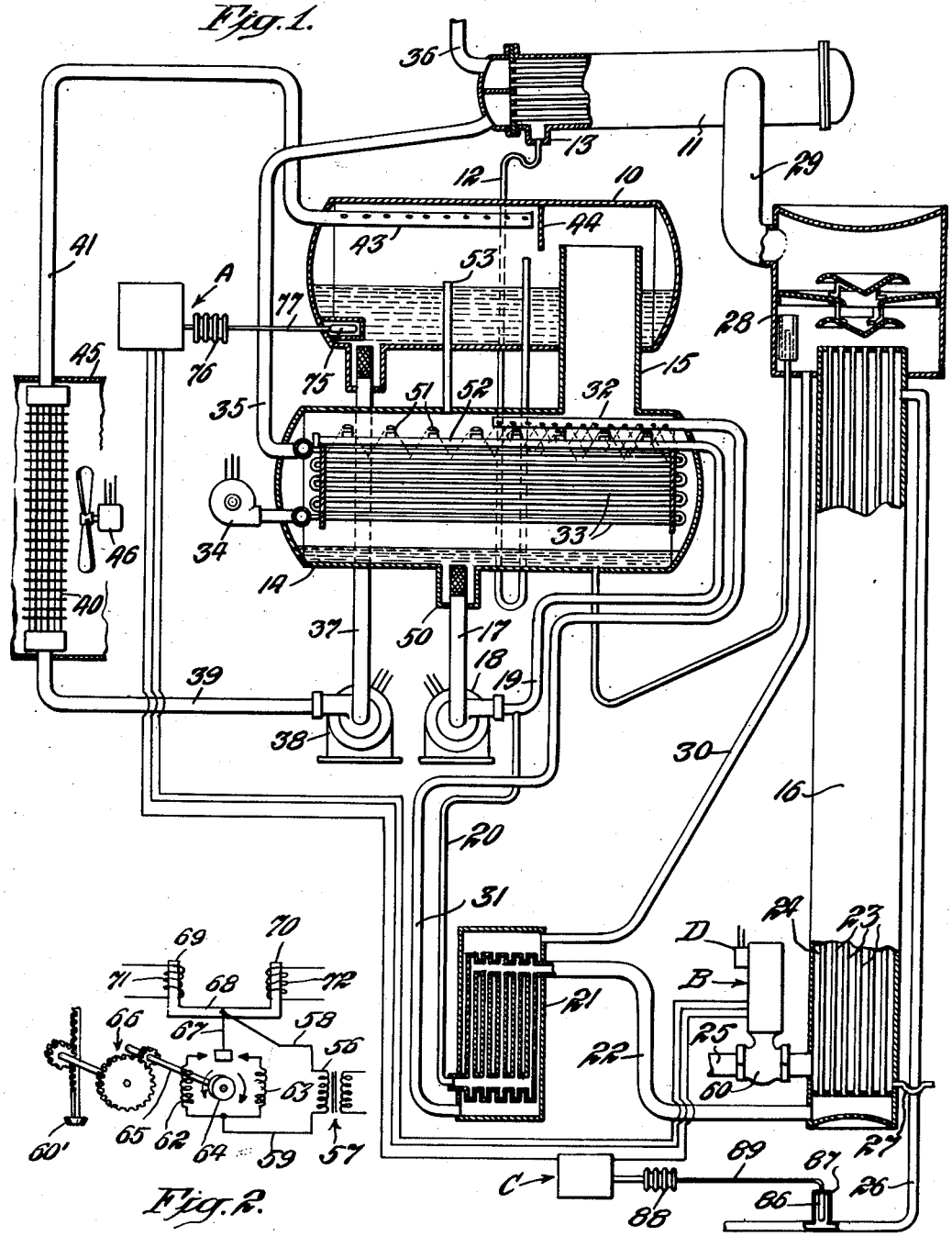
Fig. 1 is a diagrammatic view of an absorption refrigeration system incorporating the control of the present invention.
Fig. 2 is a wiring diagram of a reversible electric motor for operating a modulating valve to control the amount of heating medium supplied to the refrigeration system.

The absorption refrigeration system illustrated in Fig. 1 of the drawings is substantially identical with the system illustrated and described in the pending application for United States Letters Patent of Albert R. Thomas, Serial No. 560,214 filed October 25, 1944, and entitled "Refrigeration." In such a system, liquid refrigerant such as, for example, water is introduced into the evaporator 10 from a condenser 11 through a path of flow including a U-shaped tube 12. The evaporator 10 is in the form of a horizontally-arranged cylindrical drum and the U-shaped tube 12 has one end connected to a sump 13 at the bottom of the condenser 11 and its opposite end extended upwardly through the bottom of the evaporator. The refrigerant vapor formed in the evaporator 10 flows to an absorber 14 where the vapor is absorbed in a liquid absorbent such as, for example, a concentrated solution of lithium chloride or lithium bromide. The absorber 14 is also in the form of a horizontally-arranged cylindrical drum positioned directly below the evaporator 10. A pipe 15 extends upwardly from the top of the absorber 14 through the bottom of the evaporator 10 and for a considerable distance above the bottom to provide a standpipe therein. The standpipe 15 is adapted to exhaust refrigerant vapor from the evaporator 10 to the absorber 14 while maintaining a body of liquid refrigerant in the evaporator.

Absorption liquid enriched with refrigerant, or, in other words, a dilute salt solution, is conducted from the absorber 14 to the base of a generator 16 in a path of flow including a conduit 17, pump 18, conduits 19 and 20, liquid heat exchanger 21 and conduit 22. The generator 16 comprises a plurality of riser tubes 23 enclosed in an outer shell to provide a steam chamber 24 therebetween. Steam is supplied from any suitable source to the chamber 24 in the generator 16 through a conduit 25. The steam may be supplied under pressure from a metered service line as used in some cities or as exhaust from power or processing equipment or may be generated in a boiler particularly designed for use with the refrigeration system. An outlet vent pipe 26 is connected to the steam chamber 24 of the generator 16 adjacent its upper end to maintain the steam therein at atmospheric pressure and a constant temperature of 212° F. A condensate drain 27 also is provided adjacent the base thereof. The heating of the riser tubes 23 by the steam causes refrigerant vapor to be expelled from the absorption solution and such expelled vapor is effective to raise the absorption solution in the tubes by gas or vapor lift action. The expelled vapor passes from the upper ends of the riser tubes 23 into a vapor separator 28 and thence flows through a conduit 29 to the condenser 11 where the vapor is liquefied. Liquid refrigerant formed in the condenser 11 flows through the U-shaped tube 12 to the evaporator 10, as explained above, to complete the refrigeration cycle.

The raised absorption solution from which refrigerant vapor has been expelled is conducted from the top of the generator 16 to the absorber 14 in a path of flow including a conduit 30, liquid heat exchanger 21 and conduit 31. The end of the conduit 31 extends into the upper portion of the absorber 14 adjacent the inlet from the standpipe 15 and has a plurality of apertures or nozzles therein to provide a distributing pipe 32 for dividing the absorption solution as it is introduced into the absorber to promote absorption of the refrigerant vapor. The heat liberated by the absorption of refrigerant vapor in absorber 14 is taken up by a cooling medium such as, for example, water which flows upwardly through vertically-disposed banks of pipes or coils 33 in the absorber. The cooling water may be delivered under pressure into the lower ends of the banks of pipes 33 from a supply main or, as illustrated, may be delivered by an electrically-driven pump unit 34 from a well or cooling tower (not shown). The cooling water is discharged from the upper ends of the banks of pipes 33 in the absorber 14 through a conduit 35. Conduit 35 is connected to the condenser 11 so that the cooling water also may be utilized to effect cooling of the condenser. The cooling water is discharged from the condenser 11 through a conduit 36.

The system operates in a partial vacuum with the generator 16 and condenser 11 operating at one pressure and the evaporator 10 and absorber 14 operating at a lower pressure. The pressure differential between the high and low pressure sides of the system is maintained by a liquid column in the up-leg of the U-shaped tube 12 between a condenser 11 and evaporator 10. A similar liquid column is present in the conduit 31 connecting the absorber 14 and liquid heat exchanger 21. The pump 18 connected between the absorber 14 and liquid heat exchanger 21 also maintains the pressure differential between the absorber and generator 16.

The liquid refrigerant in the evaporator 10 is circulated continuously in a loop circuit to adapt the system to refrigerate at a place remote from the evaporator. The loop circuit comprises a conduit 37, electrically-driven pump unit 38, conduit 39, cooling element 40 and conduit 41. As illustrated in Fig. 1 of the drawings, the end of the conduit 41 extends into the evaporator 10 and has a series of apertures or nozzles to provide a liquid distributing pipe 43 for dividing the liquid refrigerant as it is returned to the evaporator to promote evaporation. Preferably a baffle plate 44 is provided in the evaporator 10 between the end of the liquid distributing pipe 43 and the standpipe 15 to prevent the liquid refrigerant from being swept into the standpipe with the refrigerant vapor. The cooling element 40 is illustrated diagrammatically as a radiator having vertical tubes extending between upper and lower headers with fins extending across the tubes to promote heat transfer. When the refrigeration system is to be used for air conditioning, the cooling element or radiator 40 extends across a duct 45 and the air in the enclosure to be cooled is circulated over the radiator by a motor-driven fan 46.

The absorption solution in the absorber 14 also is circulated continuously through an auxiliary loop circuit to promote absorption of the refrigerant vapor. The auxiliary loop circuit for the absorption solution comprises the conduit 17, pump 18 and conduit 19. The upper end of the conduit 17 extends into a sump 50 in the bottom of the absorber 14 and the lower end of the conduit is connected to the inlet of the pump 18. Conduit 19 is connected at one end to the outlet from the pump 18 and its opposite end extends throughout the length of the absorber 14 adjacent the top thereof. A series of nozzles 51 are provided in the end portion of the conduit 19 extending into the absorber 14 to provide a liquid distributing pipe 52 for dividing the absorption liquid into a fine spray as it is delivered to the absorber. During operation of the refrigeration system, part of the circulating absorption solution is diverted from the conduit 19 through the conduit 20 and liquid heat exchanger 21 to the generator 16 as previously described. To prevent an excessive accumulation of liquid refrigerant in the evaporator 10 which might cause crystallization of salt from the solution in other parts of the system, an overflow bypass tube 53 is provided between the evaporator 10 and absorber 14 and extends upwardly above the bottom of the evaporator to a level corresponding to the maximum permissible amount of refrigerant that may be removed from solution. As thus far described, the refrigeration system is substantially identical with the refrigeration system illustrated in the Thomas application referred to above.

Figure 3:
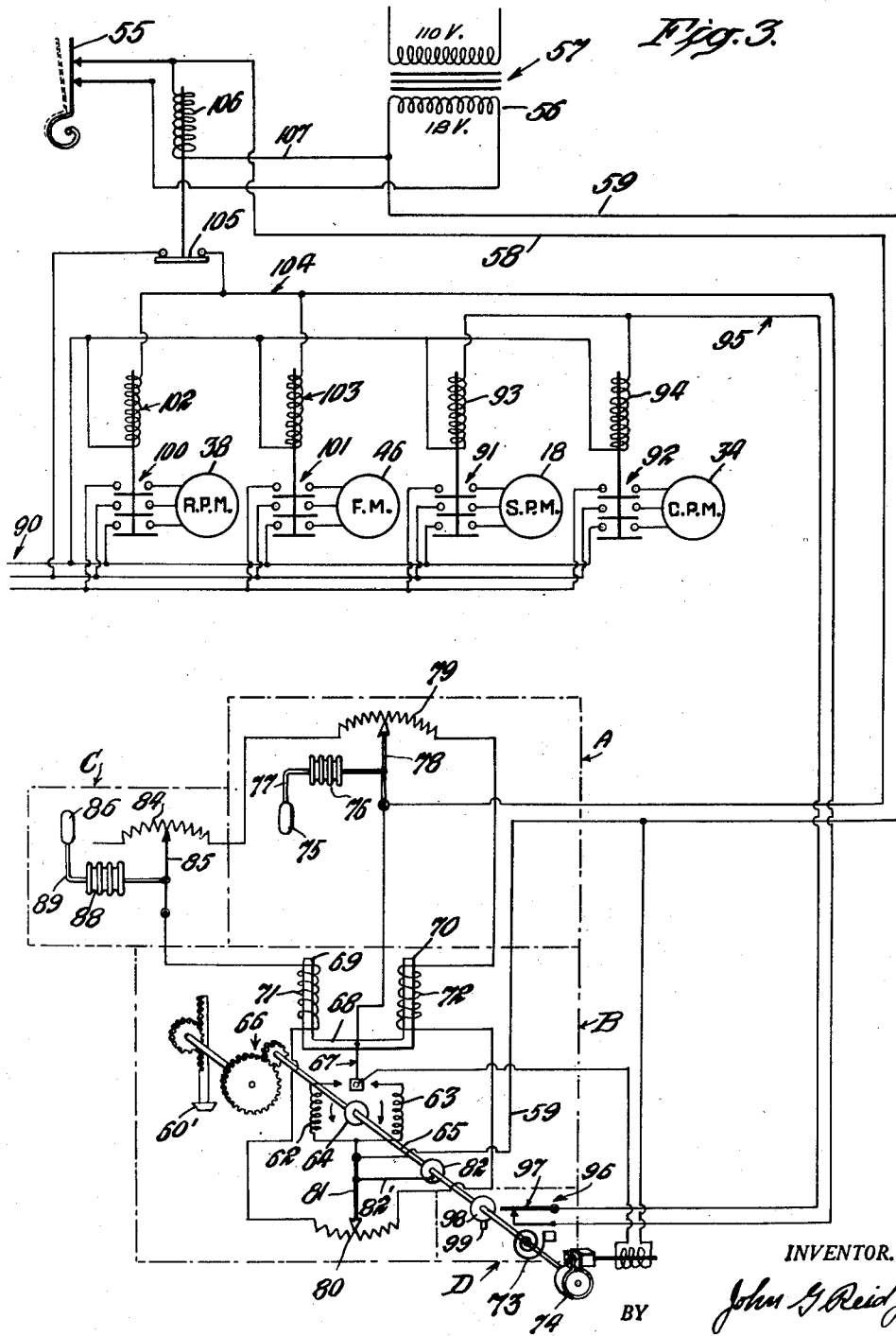
Fig. 3 is a wiring diagram of the electric control circuit for controlling the operation of the valve motor and other operative elements of the refrigeration system.

In accordance with the present invention a control is provided for starting and stopping the refrigeration system in response to variations in the ambient temperature of the enclosure to be cooled and controlling the rate of operation of the system in response to variations in a condition of the refrigerant in the evaporator 10. As illustrated in Fig. 3, the starting and stopping of the refrigeration system is initiated by a thermostatic switch 55 responsive to the temperature of the enclosure to be cooled. The thermostatic switch 55 is adapted to close and energize an electric control circuit when the temperature rises above a predetermined value and to open and deenergize the control circuit when the temperature falls below a predetermined value. The electric control circuit is connected across the secondary 56 of a step-down transformer 57 by the conductors 58 and 59 and the thermostatic switch 55 is connected in the conductor 58. A suitable control element 60 operated by the electric control circuit varies the rate of operation of the refrigeration system in response to a condition of the refrigerant in the evaporator 10 such as its temperature to maintain the lowest permissible refrigerant temperature during operation of the system consistent with the load and cooling water temperature. In other words, the control of the present invention tends to maintain a low refrigerant temperature to produce a maximum latent-to-sensible heat removal from the air to be cooled and to operate the refrigeration system from minimum to maximum capacity to maintain the low temperature under varying conditions. Furthermore, the control operates to prevent freezing of the refrigerant in the evaporator 10.

As illustrated in Fig. 1 of the drawings, the control element 60 comprises a suitable modulating valve 60 in the steam line 25 for controlling the amount of steam supplied to the steam chamber 24 of the generator 16 and thereby the rate of operation of the refrigeration system, but it will be understood that the valve may be arranged in the fuel line to control the amount of heat supplied to a boiler for supplying steam to the generator. The modulating valve 60 is operated in response to variations in the temperature of the liquid refrigerant in the evaporator and preferably the arrangement is such that small changes in evaporator temperatures will cause larger changes in the valve setting so that the refrigeration system will quickly respond to changes in evaporator temperature. The modulating valve 60 may be operated by any suitable means responsive to the temperature of the refrigerant in the evaporator 10 and as illustrated in Fig. 3, a balanced type electric circuit is provided comprising a main controller A, an electric reversing motor B connected to operate the valve 60 and an auxiliary controller C for modifying the action of the main controller A after the generator has reached a maximum capacity.

The motor B is illustrated diagrammatically in Fig. 2 as comprising two separate field windings 62, 63 and an armature or rotor 64. The movable element 60' of the valve 60 is connected to the armature shaft 65 of the motor B by suitable reduction gearing 66 so that rotation of the armature in one direction will cause the valve element to move toward closed position and rotation of the armature in the opposite direction will cause the valve element to move toward open position. The field windings 62 and 63 of the motor B are connected in parallel to one line 59 from the secondary 56 of a transformer 57 and an electrical circuit is completed through either one or the other of the windings by a tilting switch contact 67 electrically connected to the other line 58 from the transformer secondary. The tilting switch contact 67 depends from a U-shaped frame 68 pivotally mounted to rock from a neutral "off" position to one or the other of its two "on" positions. The arms 69 and 70 of the U-shaped frame 68 are of magnetic material and extend into the magnetic field of a pair of electromagnet windings 71 and 72. Thus, when the strength of the magnetic field of the electromagnet winding 71 is greater than that of the winding 72, the switch contact 67 is tilted to complete a circuit through the motor winding 62 to rotate the armature 64 in counter-clockwise direction to move the valve toward closed position. When the strength of the magnetic field of the magnet winding 72 is greater than that of the winding 71, the switch contact 67 is tilted in the opposite direction to complete a circuit through the motor winding 63 to rotate the armature in clockwise direction to move the valve toward open position. A spring 73 is connected to rotate the shaft 65 to close the valve 60 when the control circuit is deenergized but a magnetic brake 74 restrains such movement when the circuit is energized.

The relative strength of the fields of the electromagnet windings 71 and 72 is controlled by the controller A, see Figs. 1 and 3, including a thermostat which moves in response to changes in temperature of the refrigerant in the evaporator 10. The thermostat comprises a bulb 75 positioned in a well in the evaporator 10 and a motor or bellows 76. The bulb 75 and bellows 76 are connected by a capillary tube 77 and contain a volatile fluid which vaporizes and increases the pressure upon increases in temperature to expand the bellows. As illustrated in Fig. 3, the thermostat motor or bellows 76 of the controller A is connected to the movable contact arm 78 of a potentiometer having a resistance element 79 arranged in the balanced electric circuit. One end of the potentiometer resistance 79 is connected to one of the terminals of the electromagnet winding 71 and the other end of the potentiometer resistance is connected to a corresponding terminal of the electromagnet winding 72. The opposite ends of the electromagnet windings 71 and 72 are connected to the ends of the resistance element 80 of a second follow-up potentiometer arranged in the housing for the valve motor B. The movable contact arm 81 of the follow-up potentiometer is mechanically connected to a crank 82 on the armature shaft 65 of the motor B by a link 82'. One side of the secondary 56 of the transformer 57 is connected to the movable contact 78 of controller A and to the tilting switch contact 67 by the line 58, while the other side of the transformer secondary is connected to the movable contact arm 81 of the follow-up potentiometer and to the windings 62 and 63 of the motor B by the line 59.

Upon an increase in temperature of the refrigerant in the evaporator 10, the movable contact arm 78 of the controller A will be moved toward the right as viewed in Fig. 3 by the thermostat bellows 76 to decrease the resistance on the side of the circuit including the electromagnet winding 72 and increase the resistance on the side of the circuit including the electromagnet winding 71. Due to the unbalanced condition of the circuit, more current will flow through the electromagnet winding 72 than through the winding 71 to rock the tilting switch 67 and complete a circuit through the motor winding 63, thereby rotating the armature 64 clockwise to move the valve toward open position. Rotation of the armature shaft 65 will move the contact arm 81 of the follow-up potentiometer toward the left, as viewed in Fig. 3, until the resistance on both sides of the circuit is again balanced. The tilting switch 67 then will move to a neutral position to deenergize the motor winding 63 and stop the operation of the motor B. Thus, the controller A causes movement of the valve 60 in response to increases in the temperature of the refrigerant in the evaporator 10.

If the temperature of the refrigerant continues to increase and the valve 60 continues to open after the maximum capacity of the generator 16 has been reached, steam will escape from the generator through the vent pipe 26 without producing any additional refrigeration. To prevent waste of steam, a second controller C is provided in the circuit to modify the adjustment of the valve 60 by the controller A to supply the proper amount of steam to the generator to cause operation at maximum capacity without escape of any appreciable amount of steam through the vent pipe 26.

The controller C comprises a rheostat having a resistance 84 in one side of the balanced circuit between the resistance element 79 of controller A and the electromagnet winding 71 and constitutes a part of the resistance on one side of the balanced circuit. The movable contact arm 85 of the controller C is actuated by a thermostat responsive to the temperature of steam escaping through the vent pipe 26 from the generator 16. The thermostat comprises a bulb 86 located in a well 87 in the vent pipe 26, see Fig. 1, and a bellows or motor 88. The bulb 86 and bellows 88 are connected by a capillary tube 89 and contain a volatile fluid which expands the bellows upon an increase in temperature. The bellows 88 is connected by a suitable link to actuate the movable contact arm 85 of the controller C. Thus, when the temperature of the refrigerant in the evaporator 10 increases sufficiently to cause the steam valve 60 to open to such a position as to supply more steam to the generator chamber 24 than can be condensed therein, some of the steam will escape through the vent pipe 26. The thermostat bellows 88 will expand upon increase in temperature and operating through the link will move the contact arm 85 of the controller C to decrease the resistance on the side of the circuit including the electromagnet winding 71 to modify the adjustment of the controller A and thereby cause the valve 60 to be moved toward closed position until steam no longer escapes through the vent pipe 26. The controller A, therefore, varies the operation of the refrigeration system in accordance with variations of temperature in the evaporator 10 and controller C modifies the operation of controller A after the maximum capacity of the generator 16 is reached to prevent escape of steam through the vent pipe 26.

Whenever steam is supplied to the generator 16, the solution pump 18 and cooling water circulating pump 34 are operated to produce refrigeration. The motors for the solution pump 18 and cooling water circulating pump 34 may be energized by the single phase power line for supplying current to the transformer 57 but in Fig. 3 the pumps are shown connected to a separate three-phase power line 90 as controlled by switches 91 and 92. The switches 91 and 92 are, in turn, operated by relay coils 93 and 94 arranged in parallel in a relay circuit 95 connected across a single phase of the three-phase power line 90. The relay circuit 95 also includes a controller D comprising a switch 96 having a flexible leaf contact 97, see Fig. 3. Switch 96 is positioned adjacent a cam 98 on the armature shaft 65 and the cam has a lobe 99 so arranged that when the armature 64 is rotated to completely close the valve 60 the lobe engages the switch contact 97 and opens the relay circuit to deenergize the coils 93 and 94. Thus, when the valve 60 is adjusted to any open position so that steam is being supplied to the generator 16, the switch 96 of the controller D will be closed to energize the relay coils 93 and 94 which, in turn, closes the relay switches 91 and 92 to cause operation of the solution pump 18 and cooling water circulating pump 34. When the valve 60 is completely closed, the switch 96 will be opened automatically to open the relay circuit and deenergize the coils 93 and 94 to stop the operation of the solution pump 18 and cooling water circulating pump 34.

The motor of the fan unit 46 and refrigerant pump motor 38 are connected to be energized by the three-phase power line 90 as controlled by switches 100 and 101. Switches 100 and 101 are operated by relay coils 102 and 103 arranged in parallel in a second relay circuit 104 also connected across the single phase of the three-phase power line 90. The energization of the relay circuits 95 and 104 is controlled by a switch 105 which, in turn, is closed by a relay coil 106 in series with the thermostatic switch 55. As illustrated in Fig. 3 the relay coil 106 is arranged in a line 107 between the line 58 and a terminal of the transformer secondary 56. Whenever the temperature of the ambient increases above a predetermined value, the thermostatic switch 55 will operate automatically to close the circuit 107 and energize the relay coil 106 to close the switch 105 of the relay circuit 104 and thereby close the switches 100 and 101 to start operation of the refrigerant circulating pump 38 and fan 46. The fan 46 then will circulate the air over the radiator 40 until the temperature of the ambient has been reduced to the value to be maintained. The thermostatic switch 55 then will operate to open the circuit 107 which, in turn, opens the switch 105 and switches 100 and 101 to stop the operation of the refrigerant pump 38 and fan motor 46. One embodiment of the invention having now been described in detail, the mode of operation is explained as follows:

For purposes of description, let it be assumed that the thermostatic switch 55 is closed and that the movable contact arms 78, 81 and 85 of the balanced electric circuit are in the positions illustrated in Fig. 3. Such a condition indicates that the ambient in the enclosure to be cooled is above the temperature at which the thermostatic switch 55 is adjusted and that the temperature of the refrigerant in the evaporator 10 is above a predetermined low temperature. The valve 60 is partially open so that steam is being supplied to the generator 16. The relay circuits 95 and 104 are energized so that the solution pump motor 18 and cooling water pump motor 34 are in operation to produce refrigeration and the refrigerant pump 38 and fan 46 are in operation to circulate refrigerant through the interior of the radiator 40 and the air to be cooled over the exterior of the radiator. Due to the steam supplied to the chamber 24 in the generator 16, refrigerant vapor is being expelled from absorption solution in the tubes 23 which raises the solution by vapor lift action. The refrigerant vapor flows through the conduit 29 into the condenser 11 where it is condensed to a liquid and the liquid refrigerant feeds by gravity through the U-shaped tube 12 to the evaporator 10.

As the relatively high temperature air (85° F.) circulates over the surface of the radiator 40, heat is transferred to the relatively low temperature refrigerant (50° F.) in the radiator 40 which appears as sensible heat due to the pressure applied to the refrigerant by the circulating pump 38. The sensible heat in the liquid refrigerant causes a part of the refrigerant to evaporate as it is sprayed into the low pressure evaporator 10 from the spray pipe 43. The evaporation of part of the refrigerant reduces the temperature of the unevaporated liquid refrigerant which is recirculated through the radiator 40. Under light loads the rapid absorption of refrigerant vapor will tend to progressively decrease the vapor pressure and temperature of the refrigerant in the evaporator 10 and under heavy loads the slower absorption of refrigerant vapor will tend to increase the pressure and temperature of the refrigerant in the evaporator. If the temperature of the refrigerant increases, the rate of operation of the system will increase to supply more refrigerant to the evaporator to compensate for the increased rate of evaporation and increase the rate of circulation and concentration of the absorption solution supplied to the absorber 14 to increase the rate of absorption and thereby compensate for the increased load. If the temperature of the refrigerant decreases, the rate of operation of the system will decrease to compensate for the rapid absorption until the operation of the system is completely stopped to prevent freezing in the evaporator. In either case, the rate of operation of the system and the temperature of the refrigerant in the evaporator 10 will automatically adjust themselves to an equilibrium condition to maintain the lowest possible temperature for the particular load. At all times, the amount of refrigerant supplied to the evaporator 10 will correspond to the amount of refrigerant being evaporated therein.

If the load is decreasing with a corresponding decrease in the temperature and vapor pressure of the refrigerant, then less refrigerant will be needed to replace the amount evaporated in the evaporator 10. As the temperature of the refrigerant in the evaporator 10 decreases, the thermostat bellows or motor 76 of the controller A will move the contact arm 78 toward the left as viewed in Fig. 3. The resistance on the left-hand side of the electric control circuit will be decreased while the resistance on the right-hand side of the circuit will be increased. The unbalanced current flow through the magnet windings 71 and 72 will rock the tilting switch 67 to deenergize magnetic brake 74 and complete a circuit through the motor winding 62 to rotate the armature 64 in counter-clockwise direction whereby to partially close the valve 60 and decrease the amount of steam supplied to the generator 16. Such movement of the armature 64 of the motor B will operate through the link 82' to move the contact arm 81 to the right until opposite sides of the electric circuit are again balanced.

If the temperature of the refrigerant in the evaporator 10 continues to decrease, the valve 60 will continue to close until it completely shuts off the supply of steam to the generator 16. Upon a complete closure of the valve 60, the lobe 99 of the cam 98 will engage the flexible leaf contact 97 of the controller switch D and open the switch 96 and relay circuit 95. Upon opening of the relay circuit 95, the relay magnet coils 93 and 94 will be deenergized to open the switches 91 and 92 to stop the operation of the solution pump 18 and cooling water circulating pump 34.

After the valve 60 has been completely closed, the temperature of the refrigerant may gradually rise due to the continued circulation of air over the radiator 40 and such an increase in temperature will cause the controller A to move the contact arm 78 to decrease the resistance on the right-hand side of the circuit as viewed in Fig. 3, and thereby tilt the switch 67 to complete a circuit through the motor winding 63 to turn the armature 64 clockwise to open the valve 60. The initial movement of the armature 64 to open the valve 60 will cause the cam lobe 99 to release the switch contact 97 to complete the relay circuit 95 and thereby close the switches 91 and 92 to cause operation of the solution pump motor 18 and cooling water pump motor 34. In actual operation the control will open or close the valve 60 in response to the temperature of the refrigerant in the evaporator 10 until a condition of equilibrium is reached at which time the proper amount of steam will be supplied to the generator 16 to maintain the optimum temperature of the refrigerant for the particular load conditions. Furthermore, the control will operate to compensate for varying conditions such as load and cooling water temperature while maintaining the optimum refrigerant temperature. Thus, the control of the present invention will operate upon small changes in the temperature of the refrigerant in the evaporator 10 to vary the rate of operation of the refrigeration system which tends to maintain the temperature of the refrigerant substantially constant. By maintaining the temperature of the refrigerant at the lowest possible temperature a maximum ratio of latent-to-sensible heat cooling results. The closing of the valve 60 in response to decreases in refrigerant temperature also prevents the refrigerant from freezing in the evaporator.

When the temperature of the refrigerant in the evaporator 10 increases due to an increase in the load, the valve 60 will continue to increase the amount of steam supplied to the generator 16 until its maximum capacity is reached, after which steam will escape through the vent pipe 26. The thermostat bulb 86 in the vent pipe 26 being responsive to the temperature of the escaping steam, will expand the bellows or motor 88 to move the contact arm 85 of the controller C toward the right, as viewed in Fig. 3 to decrease the resistance on the left-hand side of the balanced circuit. In other words, the controller C operates to modify the controller A after a maximum capacity for the generator 16 has been reached to partially close the valve 60 until the refrigeration system operates at maximum capacity without escape of steam through the vent pipe 26.

When the temperature of the ambient in the enclosure to be cooled falls below a predetermined value, the thermostatic switch 55 will move to the dotted line position illustrated in Fig. 3 to deenergize the control circuit and the relay coil 106. Deenergization of the relay coil 106 will open switch 105 to deenergize the relay circuits 95 and 104 and open the switches 91, 92, 100 and 101 to stop the solution pump motor S. P. M., the cooling water pump motor C. P. M., the refrigerant pump motor R. P. M., and the fan motor F. M. Upon deenergization of the control circuit by the thermostatic switch 55, brake 74 will release the shaft 65 and spring 73 will turn the shaft to close the valve 60.

Figure 4:
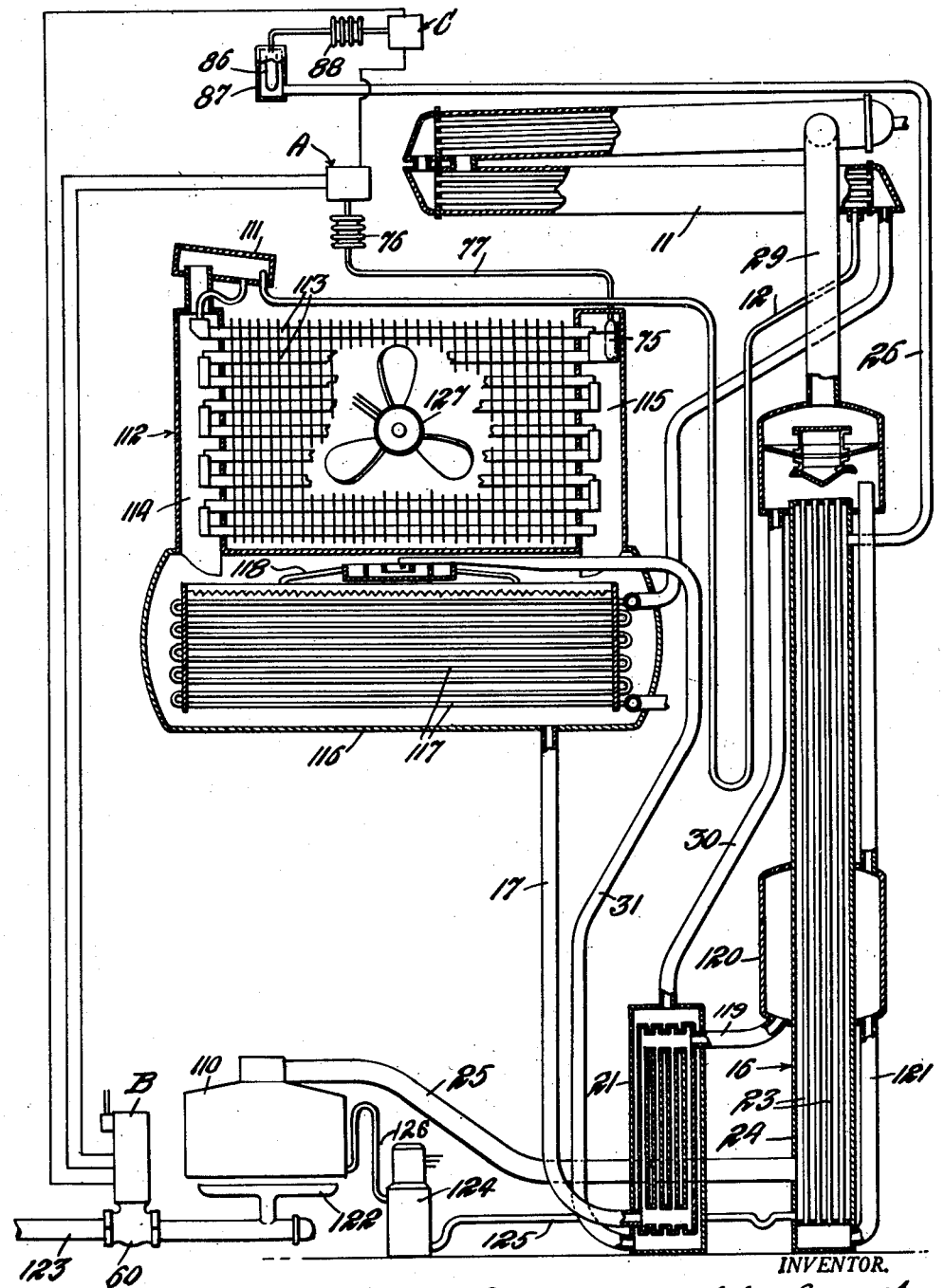
Fig. 4 is a diagrammatic view of another type of absorption refrigeration system showing the present invention applied to control the amount of fuel supplied to a heating burner.

In Fig. 4 the control of the present invention is shown applied to a refrigeration system of the type illustrated and described in the United States Letters Patent of Albert R. Thomas, No. 2,282,503, issued May 12, 1942, entitled "Refrigeration." In this embodiment of the invention, steam is supplied to the generator 16 directly from a boiler 110. This refrigeration system is similar to the system shown in Fig. 1 in that it operates in a partial vacuum and utilizes water as a refrigerant and salt solution as an absorbent. The generator 16 has the same upright tubes 23 and steam chamber 24 and the refrigerant vapor expelled from solution therein flows through a conduit 29 to a condenser 11. The condensed refrigerant flows by gravity from the condenser 11 through the U-shaped tube 12 to a flash chamber 111 and from the flash chamber to an evaporator 112. In the evaporator 112 the liquid refrigerant flows by gravity through a plurality of substantially horizontal tubes 113 successively and the tubes have open ends extending into headers 114 and 115. Directly below the evaporator 112 is an absorber 116, generally similar to the absorber 14, and having a plurality of banks or pipes 117 through which a cooling medium is circulated. Absorption solution flows from the upper part of the generator 16 through the same path of flow, including a conduit 30, heat exchanger 21 and conduit 31 to a liquid distributor 118 in the top of the absorber. Absorption solution rich in refrigerant flows by gravity from the absorber 116 back to the base of the generator 16 in a path of flow including the conduit 17, liquid heat exchanger 21, conduit 119, preheat leveling pot 120 and conduit 121.

The boiler 110 supplies steam directly to the generator 16 through the conduit 25. Boiler 110 may be heated by any suitable heater, such as the gas burner 122 illustrated, and fuel is supplied to the burner through a supply pipe 123. In the present embodiment of the invention, the modulating valve 60 is arranged in the fuel supply pipe 123 to vary the amount of fuel supplied to the burner 122. An electric motor-driven condensate pump 124 is provided for receiving condensate through a conduit 125 from the bottom of the steam chamber 24 of the generator 16 and raising it to a higher level for gravity flow through the conduit 126 to the boiler 110. An electric motor-driven fan unit 127 is provided for circulating the air to be cooled over the evaporator 112.

The control is substantially identical with that illustrated in Figs. 1 and 3 comprising the main controller A for controlling the valve motor B and the controller C responsive to steam escaping through the vent pipe 26 for modifying the action of the controller A. The first relay circuit 95, see Fig. 3, controls the operation of the condensate return pump 124 and cooling water circulating pump 34 if such a pump is used. The second relay circuit 104 controls the operation of the fan unit 127. The relay circuits 95 and 104 are, in turn, controlled by the energization or deenergization of the relay coil 106 by the thermostatic switch 55.

The operation of the control is substantially identical with that previously described. The controller A varies the adjustment of the modulating valve 60 in accordance with variations of temperature in the evaporator 112 to govern the amount of fuel supplied to the burner 122 and thereby the amount of heat supplied to the boiler 110. Steam generated in the boiler 110 flows through the conduit 25 to the steam chamber 24 in the generator 16 and the amount of steam supplied to the generator is directly proportional to the amount of heat supplied to the boiler 110. Thus, the control operates to maintain the lowest temperature in the evaporator 112 consistent with the load and the controller C operates to modify the action of the controller A when the maximum capacity of the generator 16 is reached. When the thermostatic switch 55 calls for cooling, the control circuit is energized to supply fuel to the boiler 110 and steam to the generator 16 at a controlled rate to supply refrigerant to the evaporator 10 at a rate commensurate with the rate of evaporation, and when the thermostatic switch opens, the operation of the refrigeration system is stopped. When the thermostatic switch 55 is closed the fan 127 is in operation and when steam is being supplied to the generator 16, the condensate pump 124 is in operation.

It will now be observed that the present invention provides a control for initiating the starting and stopping of the refrigeration system in response to changes in the ambient temperature and varying the rate of operation of the refrigeration system in accordance with variations in the temperature of the refrigerant in the evaporator. It will also be observed that the control of the present invention provides for modifying the main control after a maximum capacity has been reached to operate at maximum capacity without wasting heat. It will still further be observed that the present invention provides for maintaining the refrigerant in the evaporator at the lowest possible temperature to obtain a maximum latent-to-sensible heat cooling without freezing of the refrigerant in the evaporator.

While two embodiments of the invention are herein illustrated and described, it will be understood that other modifications may be made in the construction and arrangement of the parts without departing from the spirit or scope of the invention. Therefore, without limiting myself in this respect, the present invention is defined in the following claims.

What is claimed is:

1. In combination, a refrigeration apparatus operable at any capacity between minimum and maximum which varies in accordance with the amount of energy supplied, means for supplying energy to operate the refrigeration apparatus, a regulator in the energy supplying means for modulating the amount of energy supplied, a controller responsive to the temperature of the ambient to be cooled for rendering the energy supplying means operative and inoperative to supply energy to the refrigeration apparatus, and a second controller responsive to a condition of the refrigerant in the evaporator for adjusting the regulator to vary the amount of energy supplied.

2. In combination, a heat operated refrigeration apparatus including an evaporator, means for heating the refrigeration apparatus, a controller responsive to the temperature of the ambient to be cooled for rendering the heating means operative and inoperative, and a second controller responsive to a condition of the refrigerant in the evaporator for regulating the heating means to vary the amount of heat supplied and thereby regulate the rate of operation of the refrigeration apparatus.

3. In combination, an absorption refrigeration apparatus including an evaporator, heating means for supplying heat to the refrigeration apparatus, a controller responsive to the temperature of the ambient to be cooled for rendering the heating means operative and inoperative to supply heat to the refrigeration apparatus, and a second controller for operating the heating means to vary the amount of heat supplied to the refrigeration apparatus in response to variations in the temperature of the refrigerant in the evaporator.

4. In combination, an absorption refrigeration apparatus, means for supplying a heating medium to the refrigeration apparatus, a modulating valve for controlling the amount of heating medium supplied to the refrigeration apparatus, a controller responsive to the temperature of the ambient to be cooled for rendering the modulating valve operative and inoperative to control the heating medium, and a second controller for operating the modulating valve to vary the amount of heat supplied to the refrigeration apparatus in response to variations in the temperature of the refrigerant in the evaporator.

5. In combination, an absorption refrigeration apparatus including an evaporator, heating means for supplying heat to the refrigeration apparatus, means for supplying fuel to the heating means, a modulating valve for controlling the amount of fuel supplied to the heating means, a controller responsive to the temperature of the ambient to be cooled for rendering the modulating valve operative and inoperative to supply fuel to the heater, and a second controller responsive to variations in the temperature of the refrigerant in the evaporator for operating the modulating valve whereby to vary the amount of heat supplied to the heater in accordance with variations in the temperature of the refrigerant in the evaporator.

6. In an air cooling system, a refrigeration apparatus including an evaporator, a fan for circulating air over the evaporator, a controller responsive to the temperature of the ambient to be cooled for initiating operation of the refrigeration apparatus and fan, and a second controller responsive to a condition of the refrigerant in the evaporator for regulating the amount of energy supplied to the refrigeration apparatus to control its rate of operation.

7. In an air cooling system, a refrigeration apparatus including an evaporator, a controller responsive to a condition of the refrigerant in the evaporator for regulating the amount of energy supplied to the refrigeration apparatus to control its rate of operation, a fan for circulating air over the evaporator, and a second controller responsive to the temperature of the air for rendering the first controller operative to control the apparatus and initiate operation of the fan.

8. In an air cooling system, a refrigeration apparatus including an evaporator, a controller responsive to the temperature of the refrigerant in the evaporator and connected to regulate the amount of energy supplied to the refrigeration apparatus to control its rate of operation, a fan for circulating air over the evaporator, and a second controller responsive to the temperature of the air for rendering the first controller operative to control the apparatus and initiate operation of the fan.

9. In an air cooling system, an absorption refrigeration apparatus comprising a plurality of elements including a generator and evaporator interconnected for the circulation of a refrigerant, means for heating the generator to supply refrigerant to the evaporator, a controller responsive to a condition of the refrigerant in the evaporator and connected to control the heating means to vary the amount of heat supplied to the generator, a fan for circulating air to be cooled over the evaporator, and a second controller responsive to the temperature of the air for rendering the first controller operative to control the heating means and initiate operation of the fan.

10. In an air cooling system, an absorption refrigeration apparatus comprising a plurality of elements including a generator and evaporator interconnected for the circulation of refrigerant therethrough, means for heating the generator to supply refrigerant to the evaporator, a controller responsive to the temperature of the refrigerant in the evaporator and connected to control the heating means to vary the amount of heat supplied to the generator in accordance with variations in the temperature of the refrigerant, a fan for circulating air to be cooled over the evaporator, and a secondary controller responsive to the temperature of the air for rendering the first controller operative to control the heating means and initiate operation of the fan.

11. In an absorption refrigeration system comprising a plurality of elements including a generator and an evaporator interconnected to circulate a refrigerant, said generator having a heating chamber, means for supplying a heating medium to the heating chamber of the generator at a predetermined constant temperature, a modulating valve for varying the amount of heating medium supplied to the heating chamber of the generator, a controller responsive to the temperature of the ambient to be cooled for rendering the modulating valve operative and inoperative to control the heating medium and a second controller responsive to the temperature of the refrigerant in the evaporator and connected to operate the valve whereby to vary the amount of heating medium supplied to the generator in accordance with variations in the temperature of the refrigerant in the evaporator.

12. In an absorption refrigeration system comprising a plurality of elements including a generator and an evaporator interconnected to circulate a refrigerant, said generator having a heating chamber vented to the atmosphere, means for supplying steam to the chamber to heat the generator at a constant temperature, a modulating valve for varying the amount of steam supplied to the heating chamber of the generator, a controller responsive to the temperature of the ambient to be cooled for rendering the modulating valve operative and inoperative to control the heating medium and a second controller responsive to a condition of the refrigerant in the evaporator and connected to operate the valve whereby to vary the amount of steam supplied to the generator in accordance with variations in the condition of the refrigerant in the evaporator.

13. In an absorption refrigeration system of the type which operates in a partial vacuum and utilizes water as a refrigerant and a salt solution as an absorbent, a generator, a condenser, an evaporator, an absorber, conduits interconnecting the elements to provide circuits for the circulation of the refrigerant and absorbent, said generator having a heating chamber vented to the atmosphere, means for supplying steam to the chamber to heat the generator at a constant temperature, a modulating valve for controlling the amount of steam supplied to the heating chamber of the generator, a controller responsive to the temperature of the ambient to be cooled for rendering the modulating valve operative and inoperative to control the heating medium and a second controller responsive to the temperature of the refrigerant in the evaporator and connected to operate the valve whereby to vary the amount of steam supplied to the heating chamber in accordance with variations in the temperature of the refrigerant in the evaporator.

14. In an absorption refrigeration system comprising a plurality of elements including a generator and evaporator interconnected to circulate a refrigerant, said generator having a heating chamber vented to the atmosphere, means for supplying steam to the chamber to heat the generator at a constant temperature, a modulating valve for varying the amount of steam supplied to the heating chamber of the generator, a controller responsive to a condition of the refrigerant in the evaporator and connected to open and close the valve, and a second controller responsive to the temperature of steam escaping through the vent from the generator and connected to modify the operation of the valve by the first controller for decreasing the amount of steam supplied to the heating chamber.

15. In an absorption refrigeration system comprising a plurality of elements including a generator and evaporator interconnected to circulate a refrigerant, said generator having a heating chamber vented to the atmosphere, means for supplying steam to the chamber to heat the generator at a constant temperature, a modulating valve for controlling the amount of steam supplied to the heating chamber of the generator, a controller responsive to the temperature of the refrigerant in the evaporator and connected to operate the valve to vary the amount of steam supplied to the generator in accordance with the temperature of the refrigerant, and a second controller responsive to the temperature of steam escaping through the vent from the generator for modifying the operation of the valve by the first controller to maintain the heating chamber filled with steam without escape of steam through the vent.

16. In an air cooling system, an absorption refrigeration system including a generator and evaporator interconnected to circulate a refrigerant, said generator having a heating chamber vented to the atmosphere, means for supplying steam to the chamber to heat the generator at a constant temperature, a modulating valve for controlling the amount of steam supplied to the heating chamber of the generator, a fan for circulating air to be cooled over the evaporator, a thermostat responsive to the temperature of the refrigerant in the evaporator and connected to operate the valve to vary the amount of steam supplied to the heating chamber of the generator in accordance with variations in the temperature of the refrigerant, a second thermostat responsive to the temperature of steam escaping through the vent from the generator for modifying the operation of the valve by the first thermostat, and a third thermostat responsive to the temperature of the air for rendering the first thermostat effective to operate the valve and initiate operation of the fan.

17. In an absorption refrigeration system comprising a plurality of elements including a generator and evaporator interconnected for the circulation of a refrigerant, said generator having a heating chamber, means for supplying steam to the heating chamber of the generator, a modulating valve for controlling the amount of steam supplied to the generator, said evaporator being adapted to maintain a pool of liquid refrigerant therein and having an auxiliary circuit connected thereto including a cooling element and pump for recirculating the refrigerant, and a thermostat responsive to the temperature of the refrigerant in the evaporator and connected to operate the valve to vary the amount of steam supplied to the heating chamber of the generator in accordance with variations in the temperature of the refrigerant.

18. In an absorption refrigeration system comprising a plurality of elements including a generator and evaporator interconnected for the circulation of a refrigerant, said generator having a heating chamber, means for supplying steam to the heating chamber of the generator, a modulating valve for controlling the amount of steam supplied to the generator, said evaporator being adapted to maintain a pool of liquid refrigerant therein, a circuit including a cooling element and pump for recirculating the refrigerant in the evaporator, said circuit including a spray pipe in the evaporator for delivering the refrigerant in a spray to promote evaporation, and a thermostat responsive to the temperature of the pool of liquid refrigerant in the evaporator and connected to operate the valve to vary the amount of steam supplied to the heating chamber of the generator in accordance with variations in the temperature of the refrigerant.

19. In an absorption refrigeration system comprising a plurality of elements including a generator, an evaporator and absorber interconnected for the circulation of a refrigerant and absorbent, said generator having a heating chamber, means for supplying steam to the heating chamber of the generator, a modulating valve for controlling the amount of steam supplied to the generator, said evaporator being adapted to maintain a pool of liquid refrigerant therein, a circuit including a cooling element and pump for recirculating the refrigerant in the evaporator, a second circuit including a pump for recirculating the absorption solution in the absorber to promote absorption of refrigerant vapor, and a thermostat responsive to the temperature of the refrigerant in the evaporator and connected to operate the valve to vary the amount of steam supplied to the heating chamber of the generator in accordance with variations in the temperature of the refrigerant.

20. In an absorption refrigeration system comprising a plurality of elements including a generator and evaporator interconnected for the circulation of a refrigerant and absorbent, said generator having a heating chamber, means for supplying steam to the heating chamber of the generator, a modulating valve for controlling the amount of steam supplied to the generator, said evaporator being adapted to maintain a pool of liquid refrigerant therein and having an auxiliary circuit connected thereto including a cooling element and pump for recirculating the refrigerant, a thermostat responsive to the temperature of the refrigerant in the evaporator and connected to operate the valve to vary the amount of steam supplied to the heating chamber of the generator in accordance with variations in the temperature of the refrigerant, a fan for circulating air to be cooled over the cooling element, and a thermostat responsive to the temperature of the air and connected to control the operation of the fan.

21. In an absorption refrigeration system comprising a plurality of elements including a generator and evaporator interconnected for the circulation of a refrigerant and absorbent, said generator having a heating chamber, means for supplying steam to the heating chamber of the generator, a modulating valve for controlling the amount of steam supplied to the generator, said evaporator being adapted to maintain a pool of liquid refrigerant therein and having an auxiliary circuit connected thereto including a cooling element and pump for recirculating the refrigerant, a thermostat responsive to the temperature of the refrigerant in the evaporator and connected to operate the valve to vary the amount of steam supplied to the heating chamber of the generator in accordance with variations in the temperature of the refrigerant, a fan for circulating air over the cooling element, and a thermostat responsive to the temperature of the air and connected to control the operation of the fan and the pump for recirculating the refrigerant in the evaporator.

22. In an absorption refrigeration system, a generator, a condenser, an evaporator, an absorber, conduits interconnecting the elements to provide circuits for the circulation of a refrigerant and absorbent, said generator having a heating chamber, means for supplying steam to the heating chamber of the generator, a modulating valve for controlling the amount of steam supplied to the generator, said evaporator being adapted to maintain a pool of liquid refrigerant therein and having an auxiliary circuit connected thereto including a cooling element and pump for recirculating the refrigerant, a second auxiliary circuit including a pump for recirculating the absorbent in the absorber, a third auxiliary circuit for circulating a cooling medium through the absorber and condenser, a fan for circulating air over the cooling element, a thermostat responsive to the temperature of liquid refrigerant in the evaporator connected to operate the modulating valve and control the operation of the second and third auxiliary circuits, and a thermostat responsive to the temperature of the air for controlling the operation of the fan and first auxiliary circuit and conditioning the second and third auxiliary circuits for control by the thermostat responsive to the temperature of the liquid refrigerant.

23. In an absorption refrigeration system, a generator, a condenser, an evaporator, an absorber, conduits interconnecting the elements to provide circuits for the circulation of a refrigerant and absorbent, said generator having a heating chamber vented to the atmosphere, means for supplying steam to the heating chamber of the generator, a modulating valve for controlling the amount of steam supplied to the generator, said evaporator being adapted to maintain a pool of liquid refrigerant therein, an auxiliary circuit including a cooling element and pump for recirculating refrigerant in the evaporator, a second auxiliary circuit including a pump for recirculating absorption solution in the absorber, a third auxiliary circuit including a pump for circulating a cooling medium through the absorber and condenser, a fan for circulating air over the cooling element in the first auxiliary circuit, a thermostat responsive to the temperature of the liquid refrigerant in the evaporator and connected to operate the modulating valve and control the operation of the second and third auxiliary circuits, a thermostat responsive to the temperature of steam escaping through the vent from the generator chamber and connected to modify the operation of the valve by the first thermostat to prevent the escape of steam, and a thermostat responsive to the temperature of the air for controlling the operation of the fan and the first auxiliary circuit.

24. In an absorption refrigeration system, a generator, a condenser, an evaporator, an absorber, conduits interconnecting the elements to provide circuits for the circulation of a refrigerant and absorbent, said generator having a heating chamber, means for supplying steam to the heating chamber of the generator, a modulating valve for controlling the amount of steam supplied to the generator, said evaporator being so constructed and arranged as to permit the flow of liquid refrigerant therethrough by gravity without accumulation of any refrigerant therein, a fan for circulating air over the evaporator, a controller responsive to the temperature in the evaporator and connected to operate the modulating valve to vary the amount of steam supplied to the heating chamber of the generator in accordance with variations in the temperature of the refrigerant in the evaporator, and a second controller responsive to the temperature of the air to be cooled for rendering the first controller operative to control the modulating valve and initiate operation of the fan.

25. In an absorption refrigeration system comprising a plurality of elements including a generator and an evaporator interconnected to circulate a refrigerant and absorbent, said generator having a heating chamber vented to the atmosphere, a boiler connected to supply steam to the heating chamber to heat the generator at a constant temperature, a burner for heating the boiler, a source of fuel, a modulating valve for varying the amount of fuel supplied to the burner, and a controller responsive to the temperature of the refrigerant in the evaporator and connected to operate the valve whereby to vary the amount of steam generated in the boiler in accordance with variations in the temperature of the refrigerant in the evaporator.

26. In a refrigeration apparatus, a plurality of elements including an evaporator interconnected for the circulation of refrigerant, said evaporator being so constructed and arranged as to maintain a pool of refrigerant therein, an auxiliary circuit including a cooling element and pump for recirculating refrigerant in the evaporator, a regulator for varying the amount of energy supplied to the refrigeration apparatus to vary its rate of operation, and a controller responsive to a condition of the pool of refrigerant in the evaporator for actuating the regulator to operate the apparatus at a rate corresponding to the rate of evaporation of refrigerant in the evaporator.

JOHN G. REID, Jr.

REFERENCES CITED

The following references are of record in the file of this patent:

UNITED STATES PATENTS

| Number | Name | Date |
| --- | --- | --- |
| 1,960,802 | Backstrom et al. | May 29, 1934 |
| 2,112,537 | Kuenzli | Mar. 29, 1938 |
| 2,123,123 | Small et al. | July 5, 1938 |
| 2,241,328 | Selby | May 6, 1941 |
| 2,274,774 | Chambers | Mar. 3, 1942 |
| 2,282,504 | Thomas et al. | May 12, 1942 |
| 2,297,761 | Hainsworth | Oct. 6, 1942 |